June 22, 1948.    J. C. SCHELLENG    2,443,643
WAVE MODIFYING DEVICE
Filed Sept. 7, 1945    2 Sheets—Sheet 1
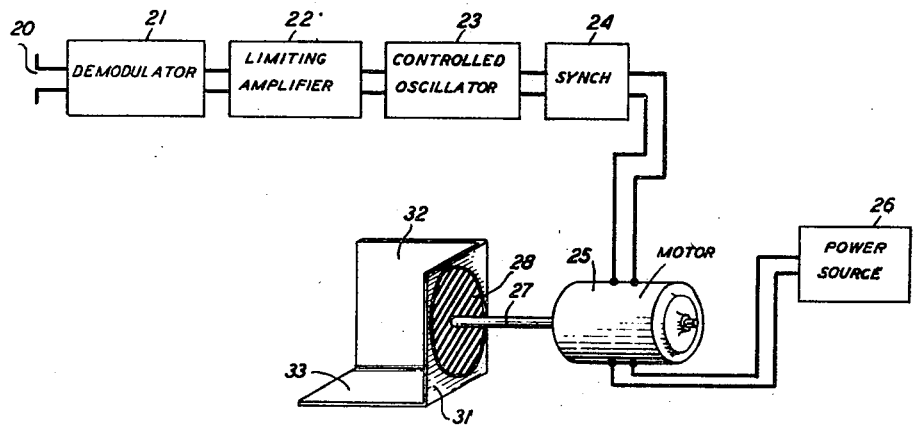
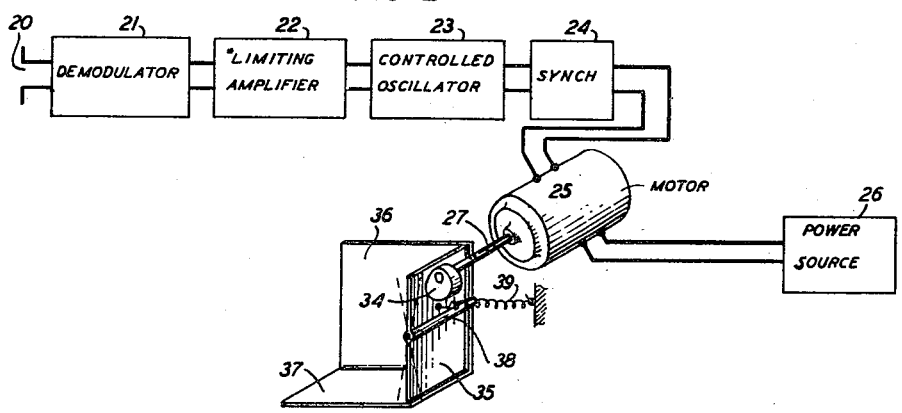
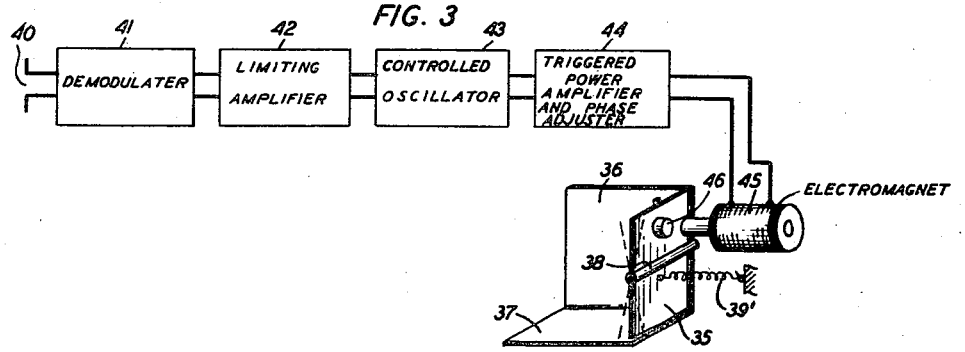
INVENTOR
J. C. SCHELLENG
BY Franklin Mohr
ATTORNEY June 22, 1948.  J. C. SCHELLENG  2,443,643
WAVE MODIFYING DEVICE
Filed Sept. 7, 1945  2 Sheets-Sheet 2

INVENTOR
J. C. SCHELLENG
BY Franklin Mohr
ATTORNEY

Patented June 22, 1948

2,443,643

UNITED STATES PATENT OFFICE 2,443,643

WAVE MODIFYING DEVICE

John C. Schelleng, Interlaken, N. J., assignor to Bell Telephone Laboratories, Incorporated, New York, N. Y., a corporation of New York Application September 7, 1945, Serial No. 614,940

16 Claims. (Cl. 343—100)

This invention relates to a wave modifying device and method, for use in misdirecting a direction finding device as a defensive measure in war, or for other purposes.

More particularly, the invention relates to a method to be practiced and an arrangement to be installed upon a vessel, structure or object the location of which may be sought to be ascertained by the operator of a direction finding apparatus, for the modification or modulation of signals reflected back to the direction finding apparatus, in order to confuse the operator thereof and lead him to assign an incorrect bearing to the vessel, structure or object.

The invention is described with particular reference to a radar as the direction finding device, operating by means of electromagnetic waves reflected by the object under observation.

It is well known that in modern warfare the radar is an extremely effective instrument for locating objects and targets at long range by the aid of precise measurements of the range and bearing of the target made by means of radio waves and not by sight.

The problem of defense against the radar may be attacked along various lines, one of which is to cause false directional indications at the radar by means of apparatus carried by the defender.

An object of the present invention, therefore, is to misdirect the enemy fire by introducing an error into the observations obtainable with the direction finding device, thereby causing the enemy gunners to aim at a position sufficiently aside from the true location of the target to enusure a safe miss.

In accordance with the invention, the response of the enemy direction finding device is modified by superposed synchronized modulations of the waves reflected from the target, thereby leading the operator of the direction finding device to read an incorrect bearing angle for the target.

The invention is designed to be effective against certain commonly employed types of direction finders, namely those which employ in the transmitting antenna a scanning action or a lobe switching action or the like to facilitate accurate determination of the direction of approach of an incoming electromagnetic wave, particularly when the angle representing the normal precision of the device is small compared with the angular width of the antenna's main lobe. Direction finders of this type are arranged to point alternately or successively in two or more slightly different directions, and they use a single antenna for both transmitting and receiving. When the response in the direction finder is equal in every direction in which it points, the true direction from which the incoming wave is approaching is accurately determined as by means of scales and pointers of well-known type attached to the direction finder.

More particularly, in the kind of conventional system commonly referred to as a lobe switching system, the direction finder is made effectively to oscillate between two directions separated by a small fixed angle. If the pointing is adjusted so that the bearing of the target in one lobing position is equal and opposite to the bearing in the other lobing position, then, in the absence of any disturbing circumstances, the response in the direction finder is the same in amplitude in either position. In locating a target with such a device, the operator changes the direction of pointing of the direction finder as a whole until the response is equal in the two lobing positions. He then judges the bearing of the target to be mid-way between the two lobing positions. In fact, his only means of determining a correct pointing for his instrument is to adjust it for equal response in the two lobing positions.

The lobing action when present in the transmitting antenna necessarily introduces a pulsation into the waves reaching the target. Usually the lobing is carried on at a constant frequency of perhaps twenty to sixty or more pulsations per second.

In accordance with the invention, the pulsations due to the lobing or scanning are intercepted and detected by apparatus located at the target and used there to control a modulating device to vary the strength of the reflected wave sent back to the direction finder. The modulation of the reflected wave at the target is synchronized with the intercepted pulsations. As a result, when the direction finder is actually correctly pointed toward the target, a stronger reflection is sent back during one lobing pulse and a weaker reflection during the next. In this way the operator is led to change the pointing of the direction finder, seeking to obtain equal reflections in the two lobing positions. By making this change in pointing, the operator turns his device to one side of the target and is led to report to the gunner an incorrect bearing for the target. There is, moreover, no feasible way in which the operator of most direction finders of this type can distinguish the apparent bearing of a target carrying the device of the present invention from the true bearing of a target which is not so equipped.

Besides the lobe switching type of apparatus, another common type to which the invention is applicable is the conical scanning type. In this type the pointing of the device is varied cyclically in such manner as to cause the scanning beam to sweep over a conical surface. When the incoming wave approaches along the axis of this cone and there is no modulation at the target, the response of the direction finder tends to be constant throughout each scanning cycle. (In any event at points diametrically opposed the responses are equal.) When pointed to one side, the response tends to go through a maximum amplitude once during each scanning cycle, thereby introducing a pulsation. The modulation at the target may be synchronized with the scanning pulsation in the same sense that it is synchronized with the lobing frequency in the case of the lobe switching type of direction finder.

It is within the scope of the invention to modulate the beam at the target in any suitable way, such as for example by deflecting the beam to one side of the radar antenna, or by variably absorbing energy from the beam, or by periodically interposing a screen or shutter in the path of the beam. These methods will be recognized as either modulating the reflected wave in the reflector or varying the directional reflecting power or the reflecting characteristics of the reflector. The methods may also be regarded as modulating the intensity of the reflected wave.

The novel features of the invention are defined in the appended claims while a number of illustrative embodiments of the invention are described hereinafter and shown in the drawings, of which:

Fig. 1 is a combined block electrical diagram and mechanical schematic representation of an embodiment involving rotation of a part of a wave reflector to effect modulation of the reflected wave;

Fig. 2 is a similar diagram and representation of an embodiment involving vibratory motion of a part of a wave reflector by means of a cam and spring;

Fig. 3 is a similar diagram and representation of an embodiment involving vibratory motion produced by means of an electromagnet.

Figure 4:
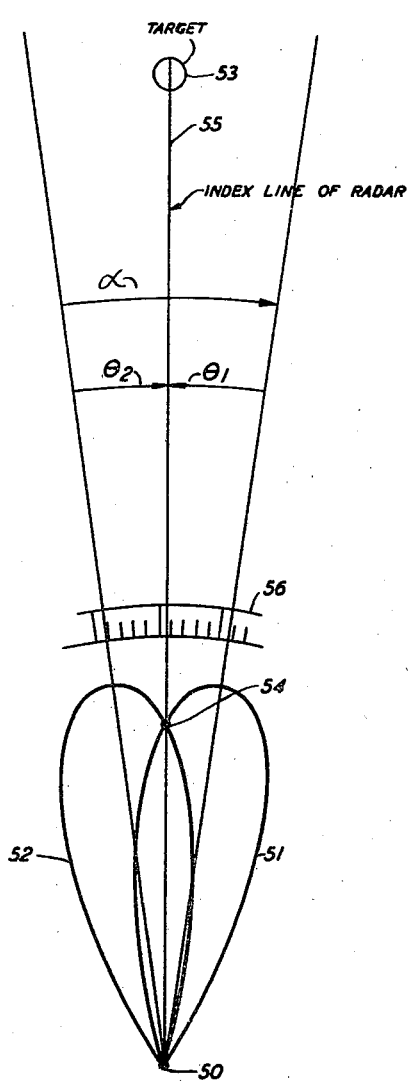
Figs. 4 and 5 are directional receiver diagrams useful in explaining the operation of a system in accordance with the invention.

Referring to Fig. 1, there is shown the apparatus installed at a target location in one embodiment of the invention. A receiving antenna 20 is connected to a demodulator 21, followed by a limiting amplifier 22 and a controlled oscillator 23 in tandem relation. The output terminals of the oscillator 23 are connected to a synchronizer or speed control device 24 of a motor 25, the latter being supplied with suitable driving current from a power source 26.

The oscillator 23 is preferably a relaxation oscillator, as for example, a multivibrator. Relaxation oscillators are well known in the art, and they have the property, useful here, that the introduction of a small voltage having either the same frequency, or a multiple, or a submultiple of the oscillating frequency is effective to synchronize the relaxation oscillator with the introduced voltage. The application of this property of the oscillator 23 to the present invention will be explained more fully hereinafter in connection with a description of the operation of the system.

The synchronizer 24 functions to control the speed of the motor 25 and may operate in any known manner adapted to the type of motor employed. In the case of a synchronous motor, the speed of the shaft 27 in revolutions per second will be directly proportional to the frequency of the voltage impressed upon the synchronizer by the oscillator 23. The synchronizer 24 in this case may be a winding in the motor 25. In the case of a direct current motor, the synchronizer may have any suitable form comprising means to vary the speed of the motor and means to actuate the speed control means in response to variations in the frequency of the voltage impressed upon the synchronizer.

Coupled to the motor 25 is a shaft 27 attached to a rotatable member 28 inserted in the plane of a reflector plate 31. The plate 31 is one of three mutually perpendicular reflecting elements, the other two of which are shown as plates 32 and 33, respectively. The reflector plates 31, 32 and 33 together with the rotatable member 28 constitute a trihedral reflector, also commonly termed a corner reflector.

The corner reflector has the well-known property of reflecting back in the direction of its approach any beam or wave incident upon the reflector which is reflected from each of the three surfaces. When in operative condition, the corner reflector serves to increase the total energy returned to the source by the target over the amount returned without the corner reflector. The latter will be referred to hereinafter as the confusing reflector since it is used to confuse the operator of the radar.

The member 28 is adapted to modify the reflecting power of the elementary surface 31 with respect to the transmission of linearly polarized waves. Many radar systems employ linearly polarized waves and accordingly the grating type of reflector as represented by the number 28 will be especially useful in combatting radars of this type. The member 28 may be a slotted disc, or a grating composed of a plurality of parallel rods, wires or the like, set in a circular frame. Many other suitable constructions for the element 28 will occur to those skilled in the high frequency art.

In the operation of the arrangement of Fig. 1, a portion of the energy of the waves sent out from a radar is intercepted by means of the antenna 20. Another portion is reflected back toward the radar by means of the trihedral reflector 31, 32, 33. The waves as received are amplitude modulated in the case of a radar operating with a scanning or lobe switching variation.

In the case of a conical scanning system, except when the axis of the conical surface passes through the receiver location, the beam is varying in direction with respect to the receiver, pointing more nearly directly toward the receiver during one part of the scanning cycle than during any other part thereof. Hence, the energy received varies cyclically during each scanning cycle.

In the case of lobe switching, except when the aim is perfect, the beam points more nearly directly toward the receiver in one lobing position than in the other, thereby introducing a periodicity or pulsation into the received wave.

In either the scanning or the switching arrangement, the fundamental frequency pulsation becomes less pronounced as the aim becomes better. At perfect aim, the fundamental frequency disappears entirely. There is present, however, in most practical cases, an even order harmonic pulsation which increases in intensity as the aim improves. In the common case of two lobing positions the double frequency component is strong when the aim is good. With conical scanning and perfect aiming there is theoretically no fluctuation observable at the target, but in practice such a perfect balance will rarely occur and will be of very brief duration. In the case of the kind of lobing which is produced by sweeping the beam continuously back and forth through the lobing angle, there will always be a strong second harmonic component present at the target when the aim is good. In the case where the beam is abruptly switched from one position to another, perfect aim and perfect switching would eliminate any fluctuations at the target, but in practice the aim is perfect only momentarily and the switching is not perfect. In particular, there is likely to be some change in the received intensity at the instant of switching which will produce a component at the second harmonic of the lobing frequency.

The function of the demodulator 21 is to detect those pulsations in the incoming wave which are due to lobing or scanning. The detected pulsations are impressed upon the limiting amplifier 22 which operates to produce a wave which has the same frequency as the pulsations but is of uniform amplitude, to promote stable and reliable operation of the succeeding elements of the system. The wave from the limiting amplifier 22 is employed to synchronize the oscillator 23 which should be of sufficient power output to actuate the speed control 24 and determine the speed of the motor 25. It will be observed that it is not necessary that the oscillator 23 develop sufficient power to run the motor, as the main power may be supplied to the motor from the source 26.

The motor 25 drives the shaft 27 rotating the grating member 28 in the plane of the reflector element 31.

Assuming the device of Fig. 1 is to be used against a radar of a type which is characterized by a second harmonic of the lobing frequency when the aim is good, since there must be one diminution of the intensity of the beam for each cycle of the fundamental of the lobing frequency, every second cycle of the received pulsation is required to produce a single diminution of the intensity. To satisfy this relation it is only necessary to select that frequency for the oscillator 23 which when applied to the synchronizer 24 will cause the shaft 27 to be driven at the required speed. The property of the oscillator 23 whereby the frequency of its oscillations may be synchronized by impressing upon the input terminals a voltage either of the same frequency or of a harmonic or a subharmonic thereof is employed here to enable the oscillator 23 to be controlled either by the lobing frequency or by the second harmonic of the lobing frequency, or both. Whichever frequency may be in control of the oscillator 23 at a given instant, the output frequency will not be affected but will be held in synchronism with the pulsations received by the antenna 20.

The operation of the arrangement of Fig. 1 serves to orient the plate 28 twice per revolution of the shaft 27 with the grating in the right direction to make the elements 31, 32, 33 cooperate momentarily as a complete corner reflector to send the received beam back to the radar. By suitable adjustment of the angular position of the grating portion 28 with respect to the shaft 27 or by an equivalent adjustment elsewhere in the system, as by shifting the angular position of the frame of the motor 25, the reflection of the beam to the radar may be synchronized with the maximum or with the minimum of the lobing pulsation received at the antenna 20. The reflected beam thus returned to the radar is added to the normal reflection from the target which is obtained without the action of the reflector 31, 32, 33.

In effect, the system of the invention superposes upon the original modulation of the wave an additional modulation that has an amplitude independent of the amplitude of the original modulation and is synchronized in time relation to the pulsations detected in the original wave.

In Fig. 2, an arrangement is shown for vibrating one plate of a trihedral reflector to modify the reflecting characteristics of the reflector as a whole. The shaft 27 terminates in a cam 34 which bears against a movable plate 35 of a deformable corner reflector comprising the plate 35 and two fixed plates 36 and 37. The plate 35 is rotatable about an axis 38 as shown. A spring 39 is arranged to hold the plate 35 against the surface of the cam 34 during rotation of the shaft 30.

During vibration, the plate 35 remains perpendicular to one of the fixed plates, 36 in the drawing, and periodically passes through a position of perpendicularity with respect to the other fixed plate, 37.

In the arrangement of Fig. 3, an electromagnetic driving mechanism, which may be similar to a loudspeaking telephone, is substituted for the motor and associated elements of the systems of Figs. 1 and 2. The system of Fig. 3 provides, in tandem relation, a receiving antenna 40, a demodulator 41, a limiting amplifier 42, a controlled oscillator 43, and a triggered power amplifier and phase adjuster 44. The output of the amplifier 44 is connected to the coil 45 of the electromagnetic driving mechanism. In cooperative relation to the coil 45 is an armature 46 which is attached to the movable plate 35 of a corner reflector assembly 35, 36, 37 like that shown in Fig. 2. A spring 39' may be used to oppose the attraction of the electromagnet.

In the operation of the arrangement of Fig. 3, the beam from the radar is intercepted by the antenna 40 and pulsations in the energy of the beam are detected in the demodulator 41. Amplitude fluctuations are reduced or eliminated in the limiting amplifier 42. The pulsations are used to synchronize the oscillator 43. The controlled oscillations are amplified in the device 44 to sufficient amplitude to actuate the driving mechanism 45, 46 and produce the desired degree of angular displacement of the plate 35. The phase of the amplified pulsations may be adjusted by means of phase adjusting means included in the device 44 to bring the vibrations of the plate 35 into phase agreement with the lobing variations.

The effect of the operation of the device of the invention, as viewed at the radar, will now be described.

Referring to Fig. 4, the lobes 51 and 52 are curves representing in polar coordinates the directional pattern of receptivity of a radar located at a point 50. The lobe 51 shows the relative sensitivity of the radar receiver in one lobing position, i. e., pointed toward the right. The distance from the point 50 to the curve 51 in any direction is representative of the relative sensitivity of the receiver to a wave approaching from that direction while the lobe switching mechanism is in the right-hand lobing position. In order to make an open curve and thereby to clarify the drawing and simplify the explanation, the directional sensitivity is represented as much less pronounced than it might be in the case of a present day radar.

Fig. 4 shows a target 53 dead ahead of the radar. In either lobing position the response in the radar to a beam transmitted to the target and reflected to the radar is the same in amplitude, and is represented by the radius from the center 50 to the intersection 54 where lobes 51 and 52 both cross the line from point 50 to the target 53. The line 50—54 extended is mid-way between the centers of the lobes 51 and 52 and is the index line of the radar, designated 55. By means of this line the bearing of the target is to be read upon a suitably arranged scale 56. To measure the bearing of a target, the radar is swung about the point 50 as a center until equal responses are secured in the two lobing positions, whereupon the bearing is read off by noting the position of the index line 55 with respect to the scale 56. In Fig. 4, the lobing angle $\alpha$ is shown as the angle between the center lines of the lobes 51 and 52. The angle of the target with respect to the center line of lobe 51 is designated $\theta_1$ and the angle of the target with respect to the center line of lobe 52 is designated $\theta_2$. When the radar is perfectly aimed at the target and there is no synchronous modulation of the beam at the target, the angles $\theta_1$ and $\theta_2$ are equal and the response of the radar is the same in either lobing position. Also, the index line 55, sufficiently extended, passes through the target.

Figure 5:
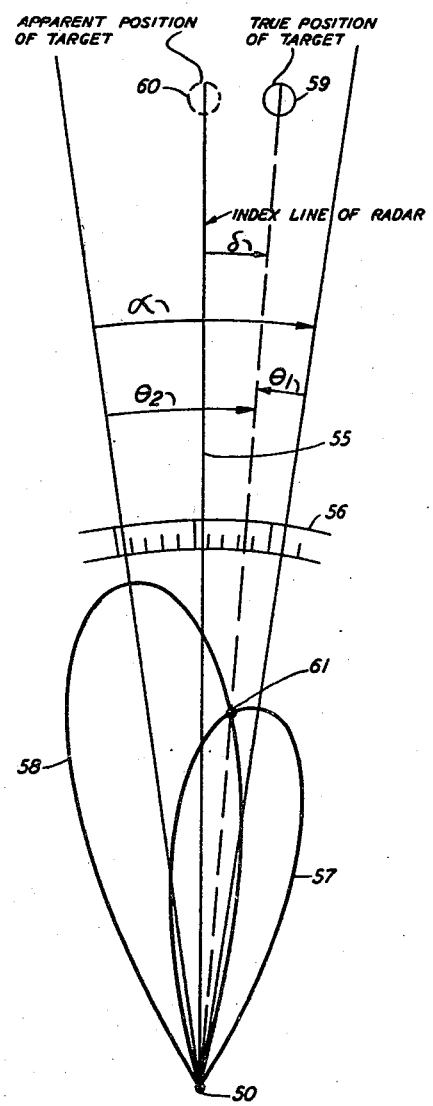

Fig. 5 represents graphically the change in the apparent directional sensitivity of the radar that may be introduced by synchronous modulation of the beam at the target. It is assumed for purposes of this figure that the corner reflector at the target is obscured while the radar is in the right-hand lobing position but sends back a reflected beam while the radar is in the left-hand lobing position, this reflected beam being in random phase relation with respect to the reflection from the target. The effect is to increase the response in every direction in the left-hand lobing position while leaving the response unchanged in all directions in the right-hand lobing position. Accordingly, the right-hand lobe 57 in Fig. 5 is the same size and shape as the lobe 51 in Fig. 4, and the left-hand lobe 58 in Fig. 5 is larger than the corresponding lobe 52, the radius in every direction being increased in a certain ratio. As before, the operator swings the radar about the point 50 as a center until he finds a setting in which the responses from the two lobes are equal, and reads the bearing of the target by noting the position of the index line 55 with respect to the scale 56. He has no other way of judging the correct aim. Without considerable measuring facilities which he is not likely to carry, he cannot tell whether increased response in one lobe is due to a change in the bearing of the target or to some interference with the beam while in transit. The operator will find a setting as shown in Fig. 5 in which the lobes 57 and 58 intersect as at the point 61. While at this setting the position of the line 50—61 on the scale 56 indicates the true bearing of the target, the apparent bearing is indicated as before, by the position of the line 55. The line 50—61 is of unknown location as far as the operator is concerned for he does not know how much of the response in either lobe is due to tampering at the target. The bearing of the target with respect to the center line of lobe 57 is again designated $\theta_1$ and the angle of the target with respect to the center line of lobe 58 is designated $\theta_2$. When the response is equal for the two lobes, the angles $\theta_1$ and $\theta_2$ are unequal as shown and there is an error angle $\delta$ introduced between the apparent and true bearings of the target. The index line 55 extends toward an apparent target position 60 while the line 50—61 extends toward the true target position 59.

The following approximate mathematical treatment is offered to facilitate an understanding of the invention and for use as a guide in estimating sizes of reflectors and amount of tilting required in actual cases. The giving of this treatment is not intended in any way to limit the scope of the invention. In what follows, the system of the invention is regarded as a case of diffraction of the type known in optical theory as Fraunhofer diffraction. In this type of diffraction the prime source of radiation and the receiving device are assumed to be each effectively at infinite distance from the aperture causing the diffraction. In other words only parallel rays are assumed to reach the aperture from the source and only parallel rays are assumed to reach the receiver from the aperture. Usually the rays from the source are made parallel by means of a parabolic reflector and generally the reflector is either circular or square. The distance from the aperture to the receiver will be assumed in this treatment to be sufficiently great to insure substantially only parallel rays reaching the receiver.

The wavelength of the radiation is assumed to be so short relative to the linear dimensions of the aperture that the bulk of the emerging radiation is confined to a narrow beam which diverges only slightly. The intensity at the receiver from such a beam is a maximum when the direction from the aperture to the receiver is normal to the plane of the aperture, and the intensity falls off rapidly as the direction departs from the normal.

Employing the analytical methods appropriate to Fraunhofer diffraction problems, the amplitude E at the receiver as a function of the angle $\theta$ (as $\theta_1$ or $\theta_2$ of Fig. 5) between the normal to the plane of the aperture and the direction from the aperture to the receiver, relative to the amplitude $E_0$ for $\theta$ equal to zero, is found to be, for a square aperture, approximately, $$\frac{E}{E_0} = \frac{\sin x}{x} \quad (1)$$

where $$x = \frac{\pi D \sin \theta}{\lambda} \quad (2)$$

and D is the length of the side of the square and $\lambda$ is the wavelength of the radiation. The corresponding expression for a circular aperture of diameter D is $$\frac{E}{E_0} = \frac{2J_1(x)}{x} \quad (3)$$

where $J_1(x)$ denotes the Bessel function of $x$, of the first kind and first order.

For ease in mathematical manipulation and with sufficient accuracy for rough calculations, I choose to represent the ratio $$\frac{E}{E_0}$$

by means of the well-known error function $$\epsilon^{-k\theta^2} \qquad (4)$$

By adjusting the value of the constant $k$, the error function may be made to approximate the amplitude ratio for either the square aperture or the circular one. For, by the well-known power expansions $$\frac{\sin x}{x} = 1 - \frac{x^2}{6} + \ldots \qquad (5)$$

$$\frac{2J_1(x)}{x} = 1 - \frac{x^2}{8} + \ldots \qquad (6)$$

and $$\epsilon^{-k\theta^2} = 1 - k\theta^2 + \ldots \qquad (7)$$

By comparison of terms between Equations 5 and 7 and between Equations 6 and 7, it is found that for the square aperture $$k = \frac{x^2}{6\theta^2} \qquad (8)$$

and for the circular aperture $$k = \frac{x^2}{8\theta^2} \qquad (9)$$

These approximations are good enough for present purposes for small angles such as are here contemplated. For small angles, $\sin \theta$ and $\theta$ are nearly equal and we have $$x = \frac{\pi D \theta}{\lambda} \qquad (10)$$

to a close approximation, and from Equations 8 and 10, for the square aperture, $$k = \frac{\pi^2 D^2}{6\lambda^2} \qquad (11)$$

Consider now that the beam is reflected from the target or other object and is received back at the transmitter. If a ray leaves the transmitter for the target at the angle $\theta$, its amplitude is reduced with respect to that of a ray leaving the transmitter at the normal, by the ratio $$\frac{E}{E_0} = \epsilon^{-k\theta^2} \qquad (12)$$

The oblique ray in accordance with the invention is reversed in direction by a specular reflection in a corner reflector at the target and returns to the aperture of the radar antenna, coming in at the same angle $\theta$. Due to diffraction at the antenna upon reception, the intensity of the received ray is less effective than it would be if it returned normal to the plane of the aperture, again by the same ratio $$\frac{E}{E_0}$$

Hence the effective ratio for the received beam may be expressed by $$\epsilon^{-2k\theta^2} \qquad (13)$$

which is the square of the ratio given by Equation 12. The ratio so far considered is an amplitude ratio, the corresponding power ratio being the square of the amplitude ratio, or $$\epsilon^{-4k\theta^2} \qquad (14)$$

Assuming lobe switching between two lobing positions, as in Fig. 5, in one lobing position the direction to the true position of the target, as measured from the beam axis, is $\theta_1$ and in the other lobing position the direction to the true position of the target is $\theta_2$. The angle $\alpha$ is then equal to the difference between $\theta_2$ and $\theta_1$, and, adopting the convention used in Fig. 5 for the direction in which $\alpha$ is to be reckoned, $$\theta_2 - \theta_1 = \alpha \qquad (15)$$

Now, in accordance with the invention, let it be assumed that the effective reflecting area at the target is being altered in synchronism with the lobe switching, so that when the target angle at the transmitter is $\theta_1$, the confusing reflector at the target is rendered inoperative. The effective target area, assumed to give non-directional reradiation, under this condition may be designated $A$. Then, when the target angle at the transmitter is $\theta_2$, the confusing reflector is brought into action. The effective modulated area of the confusing reflector may be designated $R$, making the total effective reflecting area in this condition equal to $A+R$, the two parts being assumed random in radio frequency phase.

Designating by $P_1$ and $P_2$ respectively the relative power received back at the transmitter in the two lobing positions, we have $$P_1 = A\epsilon^{-4k\theta_1^2} \qquad (16)$$

$$P_2 = (A+R)\epsilon^{-4k\theta_2^2} \qquad (17)$$

The operator, following the accustomed procedure hereinbefore described, in determining the apparent direction of the target will shift the heading of the transmitter antenna array until the power received in the two lobing positions is the same. The values of $\theta_1$ and $\theta_2$ will then satisfy the equation $$A\epsilon^{-4k\theta_1^2} = (A+R)\epsilon^{-4k\theta_2^2} \qquad (18)$$

and the operator will reckon the direction of the target to be mid-way between the two lobing positions. Due to the action of the confusing reflector, there results an error in determining the direction of the target, the angular magnitude of which error has been designated $\delta$.

The problem of designing a practical reflector in accordance with the invention will involve determining the minimum area that the reflector must have in order to cause a desired amount of angular error $\delta$.

Observing the conventions hereinbefore laid down for the senses of the respective angles $\alpha$, $\theta_1$ and $\theta_2$, and using the convention shown in Fig. 5 whereby the angle $\delta$ is turned off from the apparent target bearing toward the true target bearing, then $$\theta_1 - \delta = \delta - \theta_2 \qquad (19)$$

$$\delta = \frac{1}{2}(\theta_1 + \theta_2) \qquad (20)$$

Taking the natural logarithm of both sides of Equation 18, we obtain $$\log_\epsilon A - 4k\theta_1^2 = \log_\epsilon (A+R) - 4k\theta_2^2 \qquad (21)$$

or $$\theta_2^2 - \theta_1^2 = \frac{1}{4k} \log_\epsilon \left(1 + \frac{R}{A}\right) \qquad (22)$$

But, by Equations 15 and 20 we have $$\theta_2^2 - \theta_1^2 = (\theta_2 + \theta_1)(\theta_2 - \theta_1) = 2\delta\alpha \qquad (23)$$

Hence $$2\delta\alpha = \frac{1}{4k} \log_\epsilon (1+r) \qquad (24)$$

where the ratio $R/A$ is abbreviated as $r$.

Solving Equation 24 for $\delta$, $$\delta = \frac{\log_\epsilon (1+r)}{8k\alpha} \qquad (25)$$

and then solving Equation 25 for $r$, $$r = \epsilon^{8ka\delta} - 1 \tag{26}$$

Experience with lobe switching devices for radio microwaves has indicated that considerations of angular sensitivity and discrimination between multiple angles place a practical limit upon the relative value of the lobing angle $\alpha$ with respect to the value of $k$, approximately given by $$\alpha = \frac{1}{\sqrt{2k}} \tag{27}$$

Substituting this value of $\alpha$ into Equation 25, $$\delta = \frac{\log_\epsilon (1+r)}{4\sqrt{2k}} \tag{28}$$

And now, substituting for $k$ the value previously found for a square aperture, as given by Equation 11, we have $$\delta = \frac{\sqrt{3\lambda}\, \log_\epsilon (1+r)}{4\pi D} \tag{29}$$

$$= .14 \frac{\lambda}{D} \log_\epsilon (1+r) \tag{30}$$

or $$\log_\epsilon (1+r) = \frac{7\delta D}{\lambda} \tag{31}$$

It remains to evaluate the ratio $r$ and this is accomplished as follows. The ratio $r$ represents the quotient of the effective modulated area of the confusing reflector and the effective area of the non-modulated portion of the target. Now the reflector, being a corner reflector, acts as a specular reflector normal to the ray at any angle of incidence and hence is more effective than in direct proportion to its geometric area. The directional power gain G of any reflector, horn, paraboloid, or the like, having a given effective area $A_p$ at the aperture has been found to be $$G = \frac{4\pi A_p}{\lambda^2} \tag{32}$$

Designating the area of a uniformly illuminated circular aperture by $a$, we have $$G = \frac{4\pi a}{\lambda^2} \tag{33}$$

Then, the effective area of a circular reflector of actual area $a$ is $$R = aG = \frac{4\pi a^2}{\lambda^2} \tag{34}$$

and $$r = \frac{4\pi a^2}{A\lambda^2} \tag{35}$$

Substituting this value of $r$ in Equation 30

$$\delta = 0.14 \frac{\lambda}{D} \log_\epsilon \left(1 + \frac{4\pi a^2}{A\lambda^2}\right) \tag{36}$$

which gives the deception angle in terms of the area of the confusing reflector, the area of the target, the diameter of the radar antenna, and the wavelength of the radiation.

To obtain a clearer indication of the relationship between the reflector area and the deception angle, a useful further approximation is had in the case where the ratio $r$ is small compared with unit. Then $$\log_\epsilon (1+r) = r = \frac{7\delta D}{\lambda} \tag{37}$$

and, using Equation 35

$$\delta = \frac{1.74 a^2}{AD\lambda} \tag{38}$$

From this expression it will be observed that the deception angle varies directly with the square of the reflector area, or with the fourth power of the reflector diameter. The deception angle also varies inversely with the wavelength, the target area and the diameter of the radar antenna. Conversely, the required reflector diameter varies with the fourth root of the deception angle, and directly with the wavelength, the target area, and the diameter of the radar antenna.

If the modulation of the confusing reflector is not complete but is expressed by a modulation factor $m$, then the effective modulated area of the confusing antenna must be increased by the reciprocal of $m$, the actual area by the reciprocal of the square root of $m$, and the diameter of the reflector by the reciprocal of the fourth root. For example, if the actual modulation factor is 90 per cent, the necessary increase in the effective diameter of the confusing reflector to offset the effect of incomplete modulation is only 2.5 per cent.

Two examples of the application of the formulae will be given. First, in the case of a battleship, suppose the vessel is at a distance of 20 kilometers and it is desired to misdirect the enemy radar by a ship length, say 200 meters. In angular measure, the required error $\delta$ is 0.01 radian. It will be assumed further that the radar wavelength is 0.3 meter and that the diameter of the radar antenna aperture D is 3 meters. Experiments have shown that the effective target area A for a battleship is approximately 1,000 square meters. Substituting the recited values into Equation 31, $$\log_\epsilon (1+r) = \frac{7 \times .01 \times 3}{0.3} = 0.7 \tag{39}$$

$$r = 1 \tag{40}$$

Solving Equation 35 for $a$:

$$a = \lambda \sqrt{\frac{Ar}{4\pi}} \tag{41}$$

and substituting the values given, $$a = 0.3 \sqrt{\frac{1,000}{4\pi}} = 2.66 \text{ square meters} \tag{42}$$

which for a circular reflector means a diameter of 1.8 meters, or about 6 feet.

The second example is that of a bombing plane at a distance of 10 kilometers where the enemy radar must be misdirected by a distance of 50 meters to assure a complete miss. The required error $\delta$ in this case is 0.005 radian. The radar will be assumed to have the same wavelength and aperture as in the first example. Experiments have indicated the effective target area in the case of a bombing plane to be approximately 60 square meters. Substituting these values in Equations 31 and 41 gives $$\log_\epsilon (1+r) = \frac{7 \times 0.005 \times 3}{0.3} = 0.35 \tag{43}$$

$$r = 0.43 \tag{44}$$

$$a = 0.3 \sqrt{\frac{60 \times 0.43}{4\pi}} = 0.43 \text{ square meters} \tag{45}$$

which, in a circular reflector, means a diameter of 0.74 meter or about 29 inches.

The examples thus are seen to lead to sizes of reflectors that are feasible for use upon the battleship and bombing plane respectively.

Further calculations are desirable in order to determine approximately the angle through which the confusing reflector must be tilted or rotated in order to produce a given degree of modulation in the reflected signal.

If one surface of the corner reflector is tilted by a given angle $\varphi$ the reflected beam returned to the transmitter is shifted by $2\varphi$ and the relative power received is $$\epsilon^{-8k\phi^2}$$

In order to obtain a modulation factor of $m$ it is necessary to have the following relation satisfied:

$$\epsilon^{-8k\phi^2} = 1 - m \qquad (46)$$

Solving for $\varphi$ $$\phi^2 = -\frac{\log_\epsilon (1-m)}{8k} \qquad (47)$$

For a circular reflector with a diameter $d$, $$k = \frac{\pi^2 d^2}{8\lambda^2} \qquad (48)$$

and $$\phi = \frac{\lambda}{\pi d}\sqrt{-\log_\epsilon (1-m)} \qquad (49)$$

Substituting for $m$ the value of 0.9, $$\phi = \frac{\lambda}{\pi d}\sqrt{2.3} = \frac{0.48\lambda}{d} \qquad (50)$$

The results of calculations of the value of $\varphi$ for the same two representative cases of the battleship and the bombing plane will now be given.

We have already calculated the necessary diameter for the confusing reflector as 1.8 meters for the battleship and 0.74 meter for the bombing plane. The radar wavelength will be assumed 0.3 meter as before. These values when substituted in Equation 50 give the following results: 0.08 radian or 4.6 degrees for the battleship, and 0.2 radian or 11.3 degrees for the bombing plane.

What is claimed is:

1. Means to detect pulsations in an incoming electromagnetic wave, a reflector for said wave, means to vary the reflecting characteristics of said reflector, and means actuable by pulsations detected by said first-mentioned means to synchronize the variations of said reflecting characteristics with the detected pulsations in said incoming wave.

2. A demodulator, a wave reflector, means to vary the directional reflecting power of the reflector, and means actuable by a wave derived from said demodulator to synchronize the variations of reflecting power with the said wave derived from said demodulator.

3. A receiving antenna, a demodulator connected to said antenna, a wave reflector, means to modulate the reflected wave in said reflector, and means controlled by a wave derived from said demodulator to synchronize said modulating means with the said wave derived from said demodulator.

4. A receiving antenna for a modulated wave, a demodulator connected to said antenna for detecting pulsations in said modulated wave, a trihedral reflector for returning a portion of said modulated wave in the direction of the approach of said wave, means to deform and restore said trihedral reflector alternately, and means to synchronize the reflector deformations with the detected pulsations in said modulated wave.

5. A receiving antenna for a modulated wave, a demodulator connected to said antenna for detecting pulsations in said modulated wave, a trihedral reflector for returning a portion of said modulated wave in the direction of the approach of said wave, means to deflect one plate of said trihedral reflector, and means to synchronize the deflections of said reflector plates with the detected pulsations of said modulated wave.

6. A receiving antenna for a modulated wave, a demodulator connected to said antenna for detecting pulsations in said modulated wave, a trihedral reflector for returning a portion of said modulated wave in the direction of the approach of said wave, means to vary the reflecting power of said reflector, an oscillator controlled by said demodulator, and means to synchronize the variations of reflecting power of said reflector with the oscillations of said controlled oscillator.

7. Means to detect pulsations in an incoming electromagnetic wave, a reflector for said wave, means to vary the reflecting characteristics of said reflector, an oscillator, means controlled by detected pulsations in said incoming wave to synchronize the oscillations of said oscillator with the detected pulsations in said incoming wave, and means controlled by the oscillations of said oscillator to synchronize the variations of said reflecting characteristics with the oscillations of said oscillator.

8. Means to detect pulsations in an incoming electromagnetic wave, a reflector for said wave, means to vary the reflecting characteristics of said reflector, a multivibrator, means to synchronize the oscillations of said multivibrator with detected pulsations in said incoming wave, and means to synchronize the variations of said reflecting characteristics with the oscillations of said multivibrator.

9. A reflector comprising three planar reflecting elements mounted in mutually perpendicular relationship, one of said elements being selectively reflective for linearly polarized waves, and means to rotate said latter member.

10. A trihedral reflector, one element of which is selectively reflective for linearly polarized waves depending upon the direction of polarization thereof, and means to vary the direction of polarization for which best reflection from said selectively reflective element occurs, said last-mentioned direction lying within the plane of said element.

11. A trihedral reflector, one element of which comprises a rotatable grating of parallel linear conductive elements.

12. A method which comprises detecting pulsations in a modulated wave, reflecting said modulated wave, and modulating the intensity of the reflected wave in synchronism with the detected pulsations.

13. A method which comprises receiving a portion of the energy of a modulated wave at a given location, detecting pulsations in the received wave, reflecting another portion of said modulated wave at said location, and varying the intensity of the reflected wave in synchronism with the detected pulsations.

14. A method which comprises detecting pulsations in a modulated wave, superposing an additional modulation upon said wave which modulation is independent in amplitude with respect to the original modulation of said wave and is synchronized in time relation to the detected pulsations, and transmitting the wave with said superposed modulation thereon.

15. A method of misdirecting a radar by means of apparatus located at a target location, which method comprises detecting pulsations in the wave received at the target from the radar, and varying the reflecting power of the target for the received wave, in synchronism with the detected pulsations.

16. A method of misdirecting a radar of the type employing lobing or scanning, which method comprises detecting the frequency of the lobing or scanning from pulsations in the wave intensity received from the radar, cyclically varying the intensity of a wave reflected back to the radar, and synchronizing said intensity varying operation with the lobing or scanning frequency.

JOHN C. SCHELLENG.

REFERENCES CITED

The following references are of record in the file of this patent:

UNITED STATES PATENTS

| Number | Name | Date |
|---|---|---|
| 2,231,929 | Lyman | Feb. 18, 1941 |
| 2,405,930 | Goldberg | Aug. 13, 1946 |
| 2,412,612 | Godet | Dec. 17, 1946 |